US012317030B2

(12) United States Patent
Hsu et al.

(10) Patent No.: US 12,317,030 B2
(45) Date of Patent: May 27, 2025

(54) AIR-PRESSURE SOUNDBOX

(71) Applicant: Compal Electronics, Inc., Taipei (TW)

(72) Inventors: Chao-Kuei Hsu, Taipei (TW); Shang-Ju Tsai, Taipei (TW)

(73) Assignee: Compal Electronics, Inc., Taipei (TW)

( * ) Notice: Subject to any disclaimer, the term of this patent is extended or adjusted under 35 U.S.C. 154(b) by 226 days.

(21) Appl. No.: 18/136,023

(22) Filed: Apr. 18, 2023

(65) Prior Publication Data

US 2024/0314491 A1 Sep. 19, 2024

(30) Foreign Application Priority Data

Mar. 15, 2023 (TW) ................................ 112109562

(51) Int. Cl.
*H04R 1/28* (2006.01)
*H04R 1/02* (2006.01)
*H04R 1/30* (2006.01)

(52) U.S. Cl.
CPC ........... *H04R 1/2811* (2013.01); *H04R 1/025* (2013.01); *H04R 1/30* (2013.01)

(58) Field of Classification Search
CPC ........ H04R 1/2811; H04R 1/025; H04R 1/30; H04R 1/2803
See application file for complete search history.

(56) References Cited

U.S. PATENT DOCUMENTS 9,363,594 B2 * 6/2016 Azmi .................. H04R 1/2807
9,549,242 B2 * 1/2017 Silver .................... H04R 1/288
11,638,081 B2 * 4/2023 Bacon .................. H04R 1/1016 381/380
11,962,969 B2 * 4/2024 Liu .......................... H04R 7/04
2002/0154788 A1 * 10/2002 Tsai ..................... H04R 1/2819 381/345
2010/0183185 A1 * 7/2010 Tsai ..................... H04R 1/2853 381/386
2012/0237077 A1 * 9/2012 Nedelcu ................. H04R 9/022 381/397
2016/0073183 A1 * 3/2016 Auclair .................. H04R 1/021 181/151
2020/0383834 A1 * 12/2020 Almeflo .................. A61F 11/14
2020/0404402 A1 * 12/2020 Lin .......................... H04R 1/02
2025/0030976 A1 * 1/2025 Hatipoglu .............. H04R 1/025

FOREIGN PATENT DOCUMENTS

CN 204425603 U * 6/2015
CN 105916076 A * 8/2016 ............... H04R 1/20
CN 114885270 A 8/2022
TW 189373 B 8/1992
WO WO-2019019323 A1 * 1/2019 ............... H04R 9/02

* cited by examiner

*Primary Examiner* — Oyesola C Ojo
(74) *Attorney, Agent, or Firm* — KIRTON McCONKIE; Evan R. Witt

(57) ABSTRACT

An air-pressure soundbox is provided. The air-pressure soundbox includes a cabinet, a sound generation unit and a first ventilation panel. The cabinet has a first side surface and a second side surface opposite to each other, and includes an opening on the first side surface. The sound generation unit is disposed in the opening to seal the cabinet for forming an enclosed space. A horn of the sound generation unit faces an external space outside the cabinet. The first ventilation panel is disposed in the enclosed space to divide the enclosed space into a first subspace and a second subspace.

9 Claims, 8 Drawing Sheets

AIR-PRESSURE SOUNDBOX

CROSS-REFERENCE TO RELATED APPLICATION

This application claims priority to Taiwan Patent Application No. 112109562 filed on Mar. 15, 2023. The entire contents of the above-mentioned patent applications are incorporated herein by reference for all purposes.

FIELD OF THE INVENTION

The present disclosure relates to a soundbox, and more particularly to an air-pressure soundbox.

BACKGROUND OF THE INVENTION

For conventional soundboxes, the volume of the soundbox is usually fixed and cannot be adjusted. Since different audio frequencies require different volumes of soundbox, a soundbox with fixed volume is unable to allow the sounds at different frequency bands to have the best performance simultaneously.

For example, if the soundbox with large volume is used to emphasize low-frequency performance, it may cause too many sounds at unnecessary frequency bands to reflect inside the soundbox, resulting in a decrease of the clarity of high-frequency sounds. On the contrary, if the soundbox with small volume is used to emphasize high-frequency performance, the low-frequency performance would be suppressed.

Therefore, there is a need of providing an air-pressure soundbox in order to overcome the drawbacks of the conventional technologies.

SUMMARY OF THE INVENTION

The present disclosure provides an air-pressure soundbox including a ventilation panel disposed in an enclosed space inside the soundbox. The ventilation panel is configured to divide the enclosed space into a plurality of subspaces.

In accordance with an aspect of the present disclosure, an air-pressure soundbox is provided. The air-pressure soundbox includes a cabinet, a sound generation unit and a first ventilation panel. The cabinet has a first side surface and a second side surface opposite to each other, and includes an opening on the first side surface. The sound generation unit is disposed in the opening to seal the cabinet for forming an enclosed space. A horn of the sound generation unit faces an external space outside the cabinet. The first ventilation panel is disposed in the enclosed space to divide the enclosed space into a first subspace and a second subspace.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
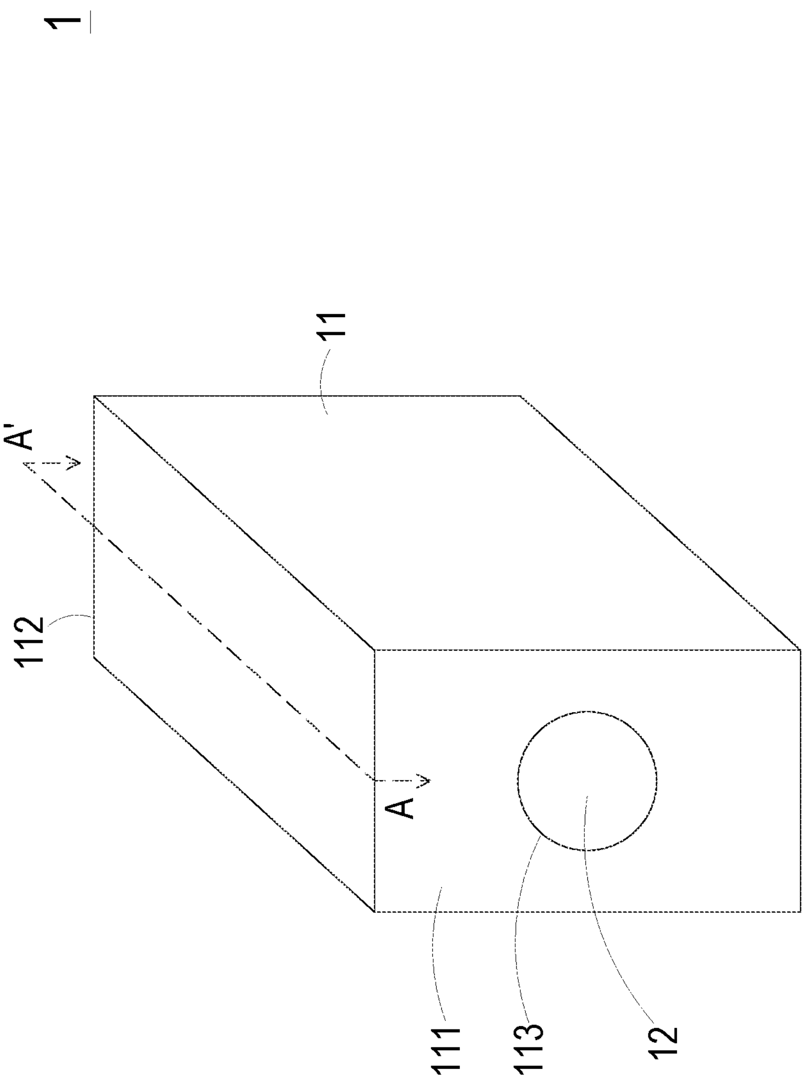
FIG. 1 is a schematic perspective view illustrating an air-pressure soundbox according to an embodiment of the present disclosure.
Figure 2:
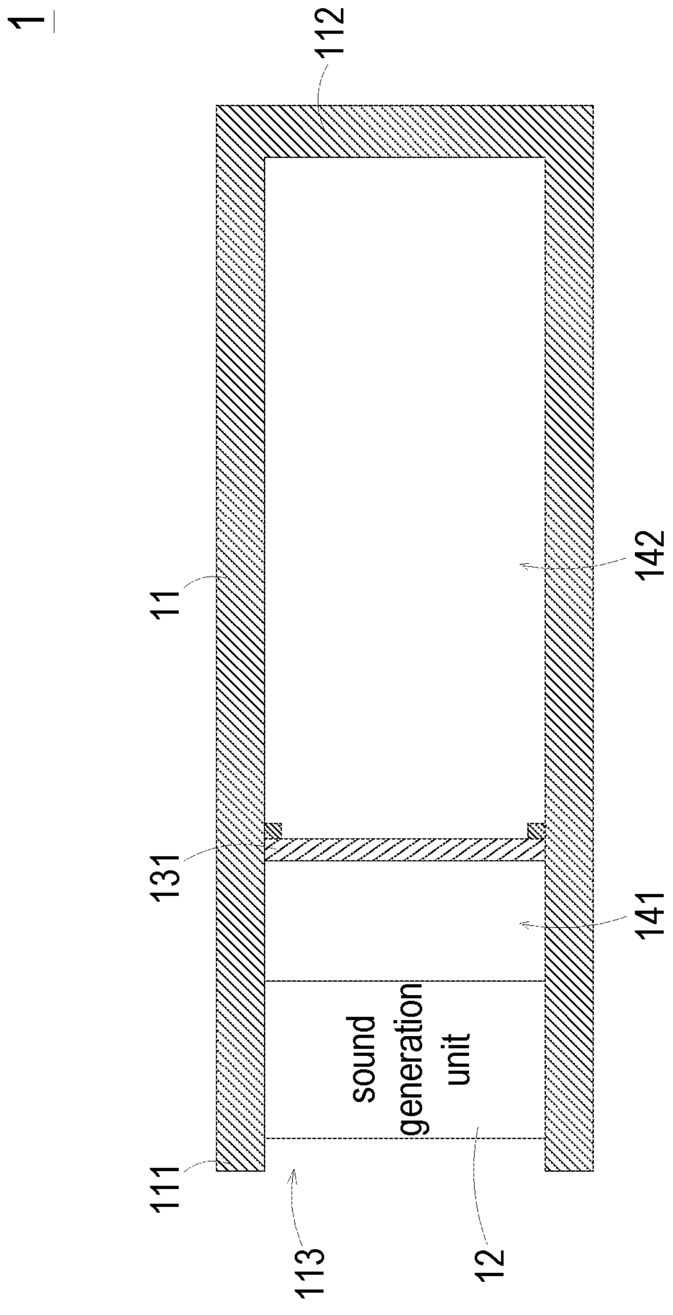
FIG. 2 is a schematic cross-sectional view of the air-pressure soundbox of FIG. 1 taken along the plane AA' according to a first embodiment of the present disclosure.

FIG. 1 is a schematic perspective view illustrating an air-pressure soundbox according to an embodiment of the present disclosure. FIG. 2 is a schematic cross-sectional view of the air-pressure soundbox of FIG. 1 taken along the plane AA' according to a first embodiment of the present disclosure. As shown in FIG. 1 and FIG. 2, the air-pressure soundbox 1 of the present disclosure includes a cabinet 11, a sound generation unit 12 and a first ventilation panel 131. The cabinet 11 has a first side surface 111 and a second side surface 112 opposite to each other, and the cabinet 11 includes an opening 113 on the first side surface 111. The sound generation unit 12 is disposed in the opening 113 to seal the cabinet 11 for forming an enclosed space. A horn of the sound generation unit 12 faces an external space outside the cabinet 11. The sound generation unit 12 is for example but not limited to a speaker. The first ventilation panel 131 is disposed in the enclosed space to divide the enclosed space into a first subspace 141 and a second subspace 142. The first ventilation panel 131 is configured to provide an acoustic impedance to filter the sound at corresponding frequency band and the air pressure.

The acoustic impedance of the first ventilation panel 131 is corresponding to a threshold frequency. In specific, the first ventilation panel 131 blocks the sound with a frequency higher than the threshold frequency, and allows the sound with a frequency lower than or equal to the threshold frequency to pass through. In other words, the first ventilation panel 131 can filter or reduce the sound which has short wavelength or attenuates easily, while the sound which has long wavelength or doesn't attenuate easily is allowed to pass through the first ventilation panel 131. Therefore, when the sound generation unit 12 outputs sounds to the enclosed space, the sound with a frequency higher than the threshold frequency (i.e., the sound which has short wavelength or attenuates easily) is blocked by the first ventilation panel 131 to be propagated in the first subspace 141 only, and the sound with a frequency lower than or equal to the threshold frequency (i.e., the sound which has long wavelengths or doesn't attenuate easily) can pass through the first ventilation panel 131 to be propagated in both the first subspace 141 and the second subspace 142. Accordingly, each of the sounds at different frequency bands can be propagated in the space with proper size to have the best performance. Further, through the filtering of the first ventilation panel 131, the energy of the sound passing through the first ventilation panel 131 is reduced so that excessive reflections are prevented. Therefore, the phenomenon of low-frequency distortion in large space is effectively suppressed.

It is noted that the acoustic impedance of the first ventilation panel 131 and the size of first subspace 141 and second subspace 142 may be determined according to the frequency band of the sound outputted by the sound generation unit 12 and the actual hearing perception, so as to obtain the best sound performance. For example, if there is a perceived lack of low-frequency volume in hearing perception, the disposed position of the first ventilation panel 131 may be adjusted to enlarge the first subspace 141. In general, the volume of the first subspace 141 should not exceed one-quarter of the volume of the enclosed space in order to prevent decreasing the effect of suppressing low-frequency distortion.

In the present disclosure, the ventilation panel may be made of any ventilated material, and its acoustic impedance depends on its material and structure. For example, the ventilation panel may be an acoustic screen mesh or an acoustic ventilated membrane. If the ventilation panel is an acoustic screen mesh, the acoustic impedance depends on the material and structure characteristics (e.g., mesh count, aperture, open area, thickness) of the acoustic screen mesh.

Figure 3:
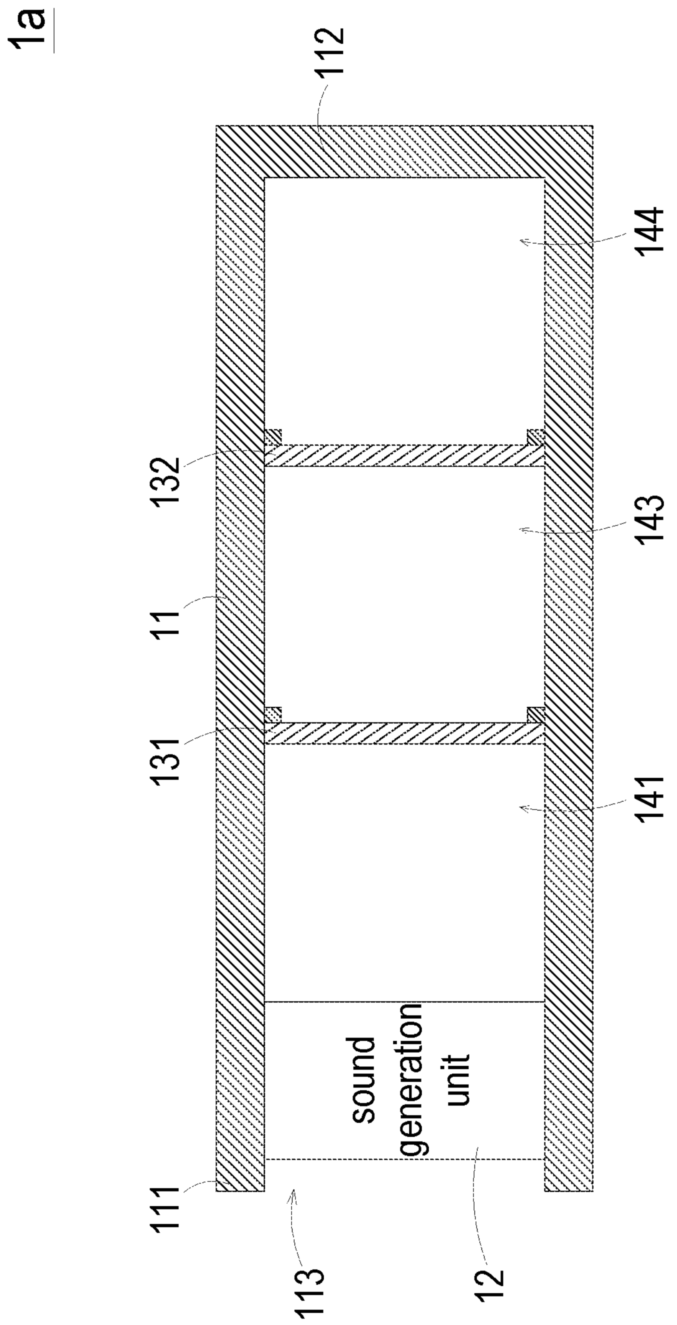
FIG. 3 is a schematic cross-sectional view of the air-pressure soundbox of FIG. 1 taken along the plane AA' according to a second embodiment of the present disclosure.

FIG. 3 is a schematic cross-sectional view of the air-pressure soundbox of FIG. 1 taken along the plane AA' according to a second embodiment of the present disclosure. The components corresponding to those of FIG. 2 are designated by identical numeral references, and detailed descriptions thereof are omitted herein. Compared with the air-pressure soundbox 1 of FIG. 2, the air-pressure soundbox 1*a* of FIG. 3 further includes a second ventilation panel 132. The second ventilation panel 132 divides the second subspace into a third subspace 143 and a fourth subspace 144. In an embodiment, the first subspace 141, the third subspace 143 and the fourth subspace 144 have the same volume.

The function of the second ventilation panel 132 is the same as that of the first ventilation panel 131, which is to provide acoustic impedance to filter the sound at corresponding frequency band and the air pressure. The acoustic impedance of the second ventilation panel 132 is lower than the acoustic impedance of the first ventilation panel 131. Moreover, it should be avoided that the acoustic impedances of the first ventilation panel 131 and the second ventilation panel 132 are too close, which may cause the volume of the sound at specific frequency band to be reduced excessively. In an embodiment, the difference between the acoustic impedance of the first ventilation panel 131 and that of the second ventilation panel 132 is greater than a preset value. In an embodiment, the acoustic impedance of the first ventilation panel 131 is twice the acoustic impedance of the second ventilation panel 132.

Figure 4:
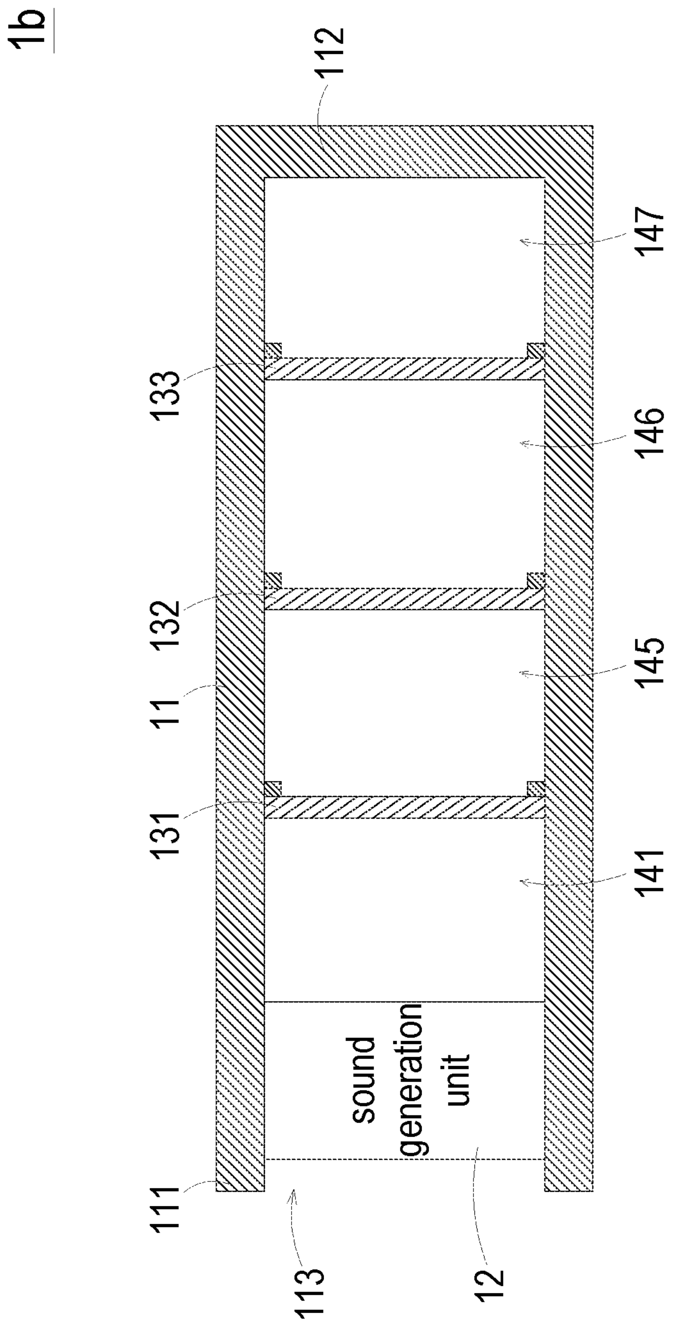
FIG. 4 is a schematic cross-sectional view of the air-pressure soundbox of FIG. 1 taken along the plane AA' according to a third embodiment of the present disclosure.

FIG. 4 is a schematic cross-sectional view of the air-pressure soundbox of FIG. 1 taken along the plane AA' according to a third embodiment of the present disclosure. The components corresponding to those of FIG. 2 are designated by identical numeral references, and detailed descriptions thereof are omitted herein. Compared with the air-pressure soundbox 1 of FIG. 2, the air-pressure soundbox 1*b* of FIG. 4 further includes a second ventilation panel 132 and a third ventilation panel 133. The second ventilation panel 132 and the third ventilation panel 133 divide the second subspace into a fifth subspace 145, a sixth subspace 146 and a seventh subspace 147. In an embodiment, the first subspace 141, the fifth subspace 145, the sixth subspace 146 and the seventh subspace 147 have the same volume.

The function of the second ventilation panel 132 and the third ventilation panel 133 is the same as that of the first ventilation panel 131, which is to provide acoustic impedance to filter the sound at corresponding frequency band and the air pressure. The acoustic impedance of the second ventilation panel 132 is lower than the acoustic impedance of the first ventilation panel 131. The acoustic impedance of the third ventilation panel 133 is lower than the acoustic impedance of the second ventilation panel 132. Moreover, it should be avoided that the acoustic impedances of the first ventilation panel 131, the second ventilation panel 132 and the third ventilation panel 133 are too close, which may cause the volume of the sound at specific frequency band to be reduced excessively.

Figure 5:
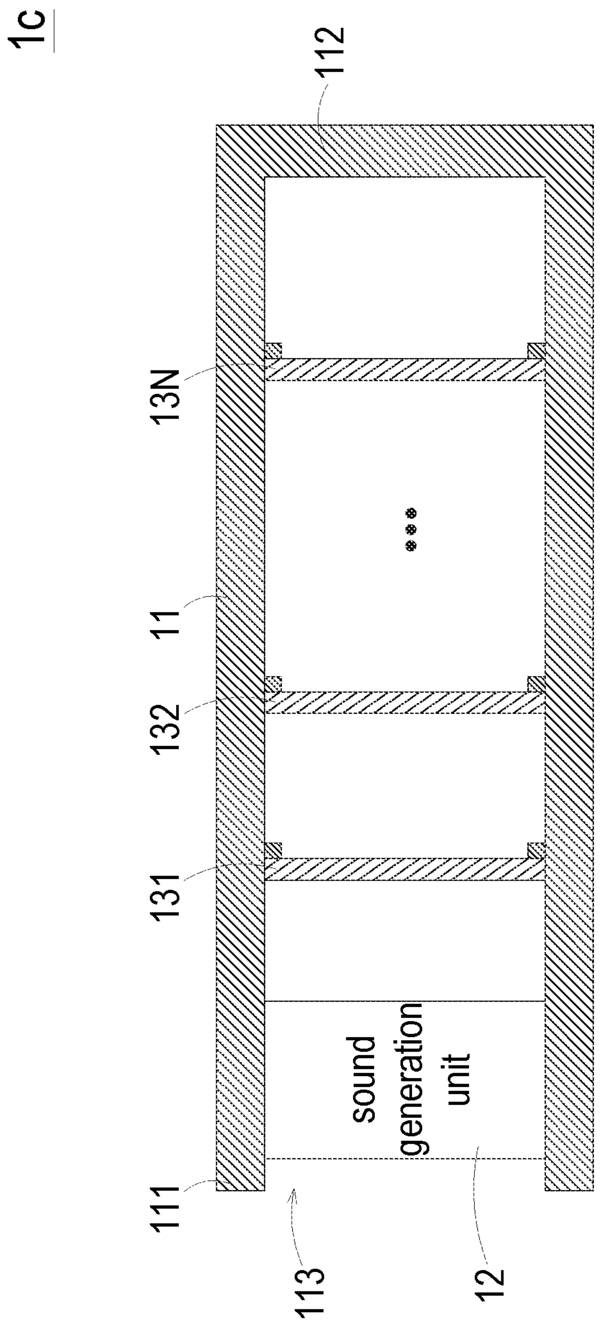
FIG. 5 is a schematic cross-sectional view of the air-pressure soundbox of FIG. 1 taken along the plane AA' according to a fourth embodiment of the present disclosure.

It is noted that the number of the ventilation plates included by the air-pressure soundbox of the present disclosure is not limited. FIG. 5 is a schematic cross-sectional view of the air-pressure soundbox of FIG. 1 taken along the plane AA' according to a fourth embodiment of the present disclosure. The components corresponding to those of FIG. 2 are designated by identical numeral references, and detailed descriptions thereof are omitted herein. In an embodiment, as shown in FIG. 5, the air-pressure soundbox 1*c* includes N ventilation panels (the first ventilation panel 131, the second ventilation panel 132, . . . , the Nth ventilation panel 13N), and N is an integer larger than 1. In the direction from the first side surface 111 to the second side surface 112 of the cabinet 11, the first ventilation panel 131 to the Nth ventilation panel 13N are disposed sequentially to divide the enclosed space inside the cabinet 11 into N+1 subspaces. In an embodiment, the N+1 subspaces have the same volume.

Among all the ventilation panels, the ventilation panel closer to the first side surface 111 have higher acoustic impedance, namely the first ventilation panel 131 has the highest acoustic impedance, and the Nth ventilation panel 13N has the lowest acoustic impedance. It should be avoided that the acoustic impedances of two neighboring ventilation panels are too close, which may cause the volume of the sound at specific frequency band to be reduced excessively. Therefore, in an embodiment, the difference between the acoustic impedances of the two neighboring ventilation panels is greater than a preset value. In an embodiment, among two neighboring ventilation panels, the acoustic impedance of the ventilation panel closer to the first side surface 111 is twice the acoustic impedance of the other ventilation panel.

Figure 6:
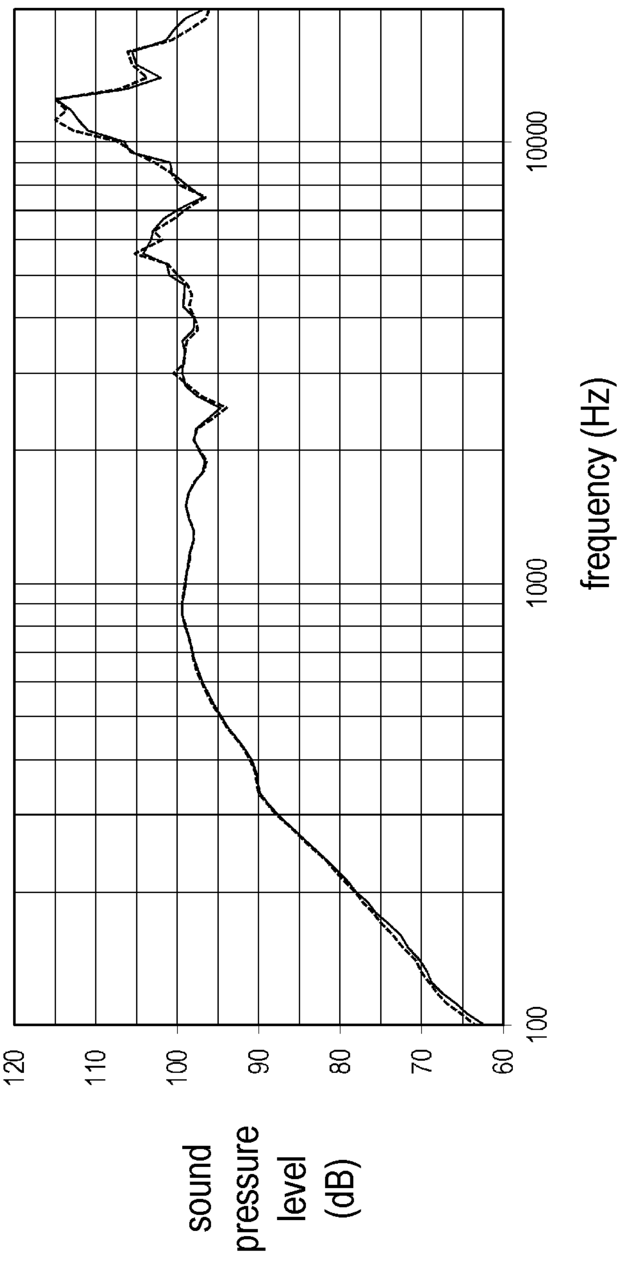
FIG. 6 schematically shows the waveforms of the frequency responses of the air-pressure soundbox of the present disclosure and the conventional soundbox.
Figure 7:
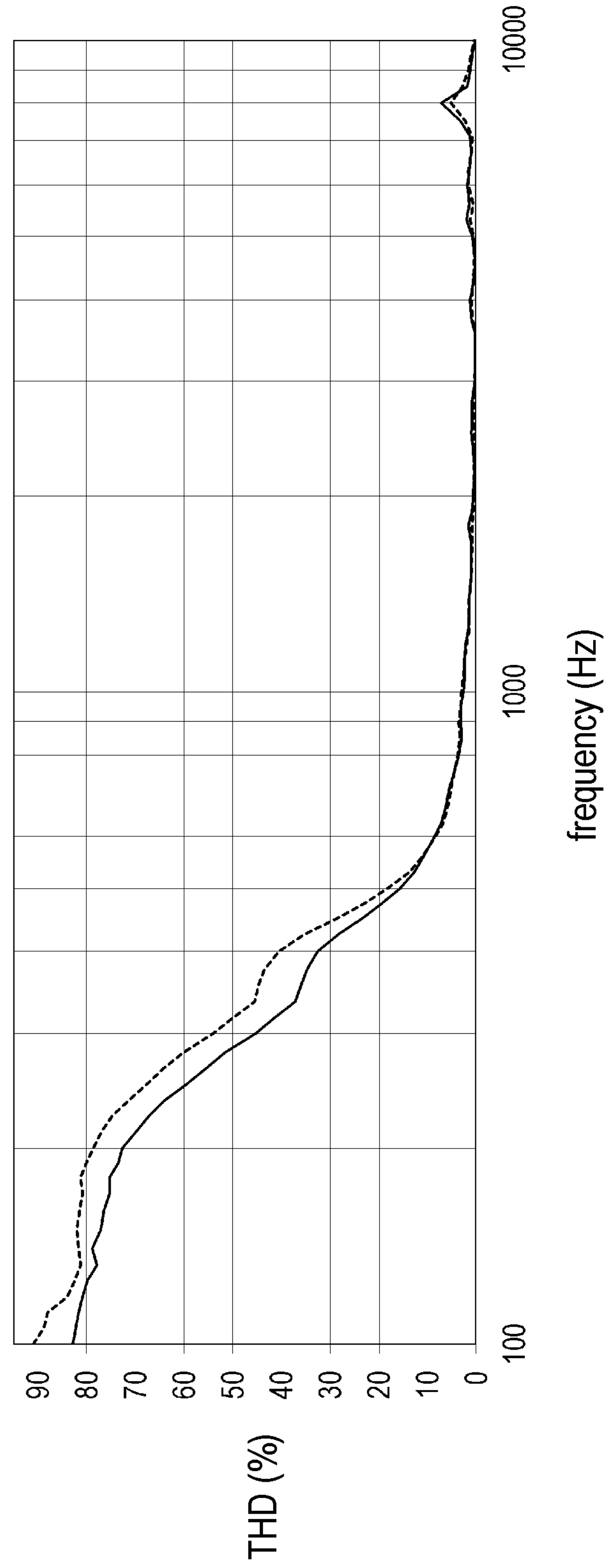
FIG. 7 schematically shows the waveforms of the total harmonic distortions of the air-pressure soundbox of the present disclosure and the conventional soundbox.
Figure 8:
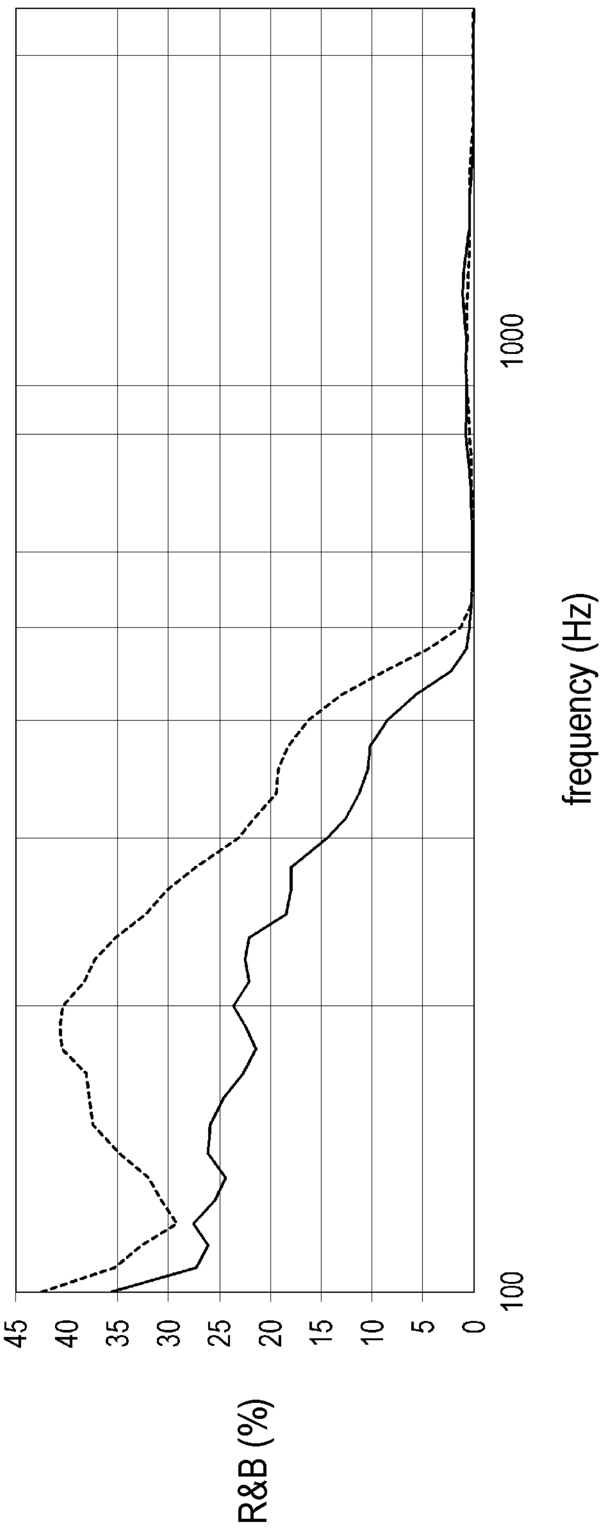
FIG. 8 schematically shows the waveforms of the high-order harmonic distortions of the air-pressure soundbox of the present disclosure and the conventional soundbox.

Regarding the air-pressure soundbox 1*c*, as an example, N equals 4, and the acoustic impedances of the first to fourth ventilation panels are 75, 42, 25 and 10 MKS rsyles respectively. Through comparing the air-pressure soundbox 1*c* to the conventional soundbox with the same total volume, FIG. 6, FIG. 7 and FIG. 8 show the frequency response, THD (total harmonic distortion) and R&B (high-order harmonic distortion) of these two soundboxes. The waveforms of parameters the air-pressure soundbox of the present disclosure and the conventional soundbox are depicted by solid lines and dashed lines respectively.

As shown in FIG. 6, there is no significant difference in frequency response between the air-pressure soundbox of the present disclosure and the conventional soundbox.

Although the ventilation panel disposed in the present disclosure would reduce the volume of sound, the performance of the frequency response at each frequency band is not affected actually. As shown in FIG. 7 and FIG. 8, the air-pressure soundbox of the present disclosure can reduce the THD and R&B at low frequency (lower than 500 Hz) effectively. It should be noted that the specific frequency band where the THD and R&B are improved depends on the acoustic impedance of each ventilation panel and the size of each subspace. In practice, under the premise of not affecting the frequency response, the acoustic resistance should be chosen as high as possible so as to reduce the THD and R&B as much as possible.

In summary, the present disclosure provides an air-pressure soundbox. In the enclosed space inside the soundbox, the ventilation panel is disposed to divide the enclosed space into a plurality of subspaces. The ventilation panel provides an acoustic impedance to filter the sound at corresponding frequency band and the air pressure. Accordingly, each of the sounds at different frequency bands can be propagated in the space with proper size to have the best performance. Further, through the filtering of the ventilation panel, the energy of the sound passing through the ventilation panel is reduced so that excessive reflections are prevented. Therefore, the phenomenon of low-frequency distortion in large space is effectively suppressed.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An air-pressure soundbox, comprising:

a cabinet, having a first side surface and a second side surface opposite to each other, and comprising an opening on the first side surface;

a sound generation unit, disposed in the opening to seal the cabinet for forming an enclosed space, wherein the sound generation unit is configured to emit sound toward an external space outside the cabinet;

a first ventilation panel, disposed in the enclosed space to divide the enclosed space into a first subspace and a second subspace; and a second ventilation panel, wherein the second ventilation panel divides the second subspace into a third subspace and a fourth subspace, and an acoustic impedance of the second ventilation panel is lower than an acoustic impedance of the first ventilation panel.

2. The air-pressure soundbox according to claim 1, wherein a difference between the acoustic impedance of the first ventilation panel and the acoustic impedance of the second ventilation panel is greater than a preset value.

3. The air-pressure soundbox according to claim 1, wherein the acoustic impedance of the first ventilation panel is twice the acoustic impedance of the second ventilation panel.

4. The air-pressure soundbox according to claim 1, wherein the first subspace, the third subspace and the fourth subspace have a same volume.

5. The air-pressure soundbox according to claim 1, further comprising a third ventilation panel, wherein the third ventilation panel divide the fourth subspace into a fifth subspace and a sixth subspace, and an acoustic impedance of the third ventilation panel lower than the acoustic impedance of the second ventilation panel.

6. The air-pressure soundbox according to claim 5, wherein the first subspace, the third subspace, the fifth subspace and the sixth subspace have a same volume.

7. The air-pressure soundbox according to claim 1, wherein the first ventilation panel is configured to block a sound with a frequency higher than a threshold frequency.

8. The air-pressure soundbox according to claim 1, wherein the first ventilation panel is an acoustic screen mesh or an acoustic ventilated membrane.

9. The air-pressure soundbox according to claim 1, wherein a volume of the first subspace does not exceed one-quarter of a volume of the enclosed space.

* * * * *